(12) United States Patent
Mane et al.

(10) Patent No.: US 12,164,814 B2
(45) Date of Patent: Dec. 10, 2024

(54) DATA STORAGE SYSTEM WITH DISTRIBUTED OPERATIONS FOR KNOWN HARDWARE

(71) Applicant: Seagate Technology LLC, Fremont, CA (US)

(72) Inventors: Hemant Vitthalrao Mane, Niwot, CO (US); Jason Matthew Feist, Minneapolis, MN (US); Praveen Viraraghavan, Chicago, IL (US); Robert W. Dixon, Longmont, CO (US); Marc Timothy Jones, Longmont, CO (US); Steven Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 81 days.

(21) Appl. No.: 17/847,623

(22) Filed: Jun. 23, 2022

(65) Prior Publication Data
US 2023/0418525 A1 Dec. 28, 2023

(51) Int. Cl.
*G06F 3/06* (2006.01)

(52) U.S. Cl.
CPC .......... *G06F 3/0689* (2013.01); *G06F 3/0604* (2013.01); *G06F 3/0655* (2013.01)

(58) Field of Classification Search
CPC .............................. G11B 27/11; G06F 3/0689
See application file for complete search history.

(56) References Cited

U.S. PATENT DOCUMENTS

| | | | |
|---|---|---|---|
| 7,707,300 B1 * | 4/2010 | Champagne | H04L 45/38 709/231 |
| 10,248,791 B2 | 4/2019 | Pappachan et al. | |
| 10,601,593 B2 | 3/2020 | Antonopoulos et al. | |
| 10,673,638 B2 | 6/2020 | Gulati et al. | |
| 2007/0250519 A1 * | 10/2007 | Fineberg | G11B 27/11 |
| 2014/0025770 A1 * | 1/2014 | Warfield | G06F 16/256 709/213 |
| 2014/0075065 A1 * | 3/2014 | Haeffner | G06F 3/0689 710/74 |
| 2016/0180255 A1 * | 6/2016 | Goedemondt | G06Q 10/00 705/7.11 |
| 2020/0272744 A1 | 8/2020 | Kaushik et al. | |
| 2021/0385198 A1 * | 12/2021 | Lee | G06F 21/566 |
| 2022/0070504 A1 * | 3/2022 | Hartnett | H04N 21/21805 |

* cited by examiner

*Primary Examiner* — Getente A Yimer
(74) *Attorney, Agent, or Firm* — Hall Estill Law Firm

(57) ABSTRACT

A distributed data storage system can be configured with a host connected to a device and a distribution module. The distribution module identifies a manufacturing origin of the device and diverts a system operation from an upstream component connected to the distribution module to the device in response to the identified manufacturing origin of the device. The manufacturer installed operating parameters of the device are then used to complete the system operation.

20 Claims, 4 Drawing Sheets

DATA STORAGE SYSTEM WITH DISTRIBUTED OPERATIONS FOR KNOWN HARDWARE

SUMMARY

Embodiments of the present disclosure generally relate to the distribution of system operations in response to the identification of the manufacturing origin of system hardware.

Embodiments of a distributed data storage system have a host connected to a device and a distribution module. The distribution module identifies a manufacturing origin of the device and diverts a system operation from an upstream component connected to the distribution module to the device in response to the identified manufacturing origin of the device. The manufacturer installed operating parameters of the device are then used to complete the system operation.

Other embodiments of a distributed data storage system a host connected to a device and a distribution module. In response to detecting the device has an unknown manufacturing origin with the distribution module, the distribution module predicts a manufacturer installed operating parameter of the device and diverts a system operation from an upstream component connected to the distribution module to the device to utilize the predicted operating parameter to complete the system operation with the device.

These and other features which may characterize various embodiments can be understood in view of the following detailed discussion and the accompanying drawings.

DETAILED DESCRIPTION

Embodiments of a data storage system are directed to identifying a manufacturing origin of hardware and distributing system operations to known hardware to optimize the use of system resources.

The ability to store and retrieve data from memory has allowed hosts to digitally control information. As greater volumes of data are generated, transferred, and accessed by a growing number of users, multiple data storage devices are being concurrently utilized to provide larger data capacity and resiliency to memory failures and data errors. The interconnection of data storage devices with remote hosts has allowed users to employ memory and data services without being physically proximal to the devices storing data. Such distributed data storage systems can provide modularity and flexibility for changing host, data, and memory conditions.

While the remote interconnection of devices and hosts can provide robust data storage and retrieval when nominally operating, current distributed data storage system configurations can be plagued by inefficiencies as operational bottlenecks limit the capability of the system to process background tasks that serve to maintain the integrity and performance of data as well as memory storing the data. The identification of operational bottlenecks can allow for the alteration of work flow to mitigate performance degradation, but such techniques has been capable merely providing temporary bottleneck relief that corresponds with greater long-term recovery to achieve maximum system performance, such as data latency, error rate, overall time to satisfy a request, and availability to accept new data and access requests.

Accordingly, assorted embodiments are directed to intelligently distribute data and/or memory operations to downstream system hardware in response to the identification of hardware as being manufactured by a known manufacturer. By leveraging the default protocol, schemes, and capabilities of hardware fabricated by known manufacturers, a distributed data storage system can effectively mitigate operational bottlenecks over long periods of time as distributed operations are completed and do not accumulate for later satisfaction by upstream system components. The utilization of existing, manufacturer-installed aspects of a hardware component to satisfy system operations transferred from upstream system components allows for seamless system operation without initializing, installing, or enabling the downstream hardware component with such aspects. As a result, dynamic system conditions can be handled without jeopardizing the performance of system hardware or the integrity of data stored in the system.

Figure 1:
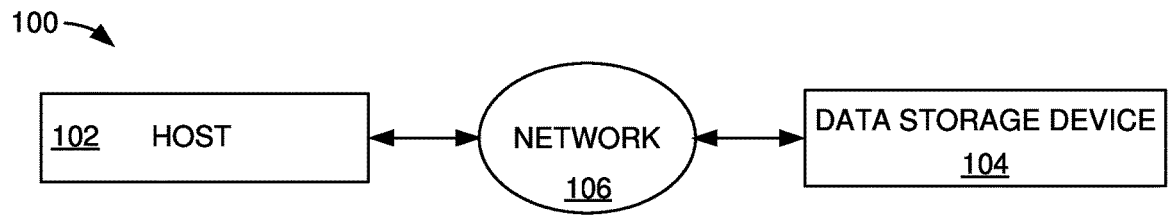
FIG. 1 depicts a block representation of an example data storage system in which various embodiments can be practiced.

An example distributed data storage system 100 in which various embodiments can be practiced is shown in FIG. 1. While not limiting, the data storage system 100 connects a host 102 to a data storage device 104 via a network 106. A host 102 can be any intelligent node that can generate data access requests that are satisfied by the intelligence of the data storage device 104. It is noted that the network 106 can be any individual, or combination, of wired and/or wireless signal pathways that allow the data storage device 104 to in nearly any physical location on the planet to store data generated by the host 102.

Figure 2:
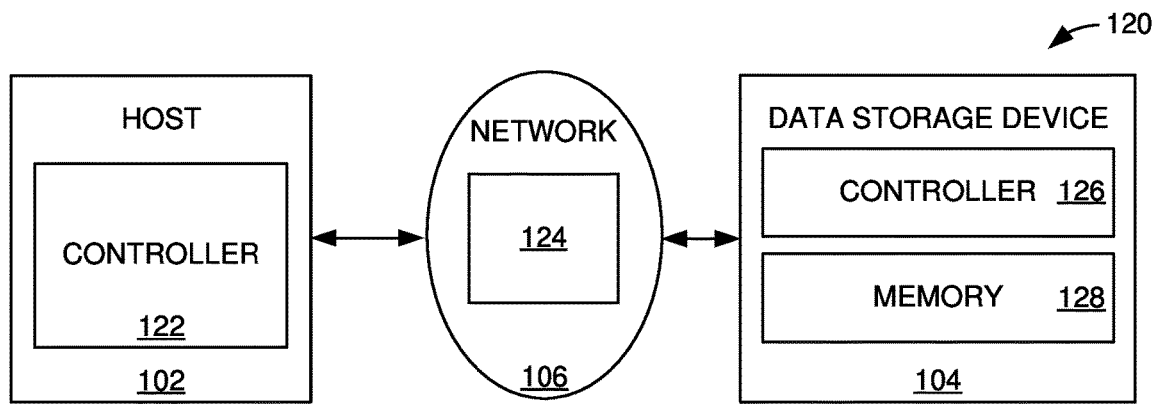
FIG. 2 depicts a block representation of portions of an example data storage system arranged in accordance with some embodiments.

FIG. 2 depicts a block representation of portions of an example distributed data storage system 120 arranged in accordance with various embodiments. Any number of hosts 102 may be connected to any number of data storage devices 104 via a network 106 that consists of at least one centralized intelligence that schedules and distributes various data and system activities to selected data storage devices 104 for execution.

Although not required or limiting, the respective hosts 102 can have a controller 122 that generates data and data access requests that are distributed to selected data storage devices 104 by a network controller 124 and subsequently satisfied by a local device controller 126. The ability to interconnect and utilize numerous different data storage devices 104 allows increasing numbers of hosts 102 to be serviced concurrently. The use of sophisticated data management protocol, such as NVMe, can further take advantage of the concurrent utilization of assorted data storage devices 104 to provide relatively high data access performance.

However, the flow of data, data access requests, and system tasks through the upstream network components, such as servers, switches, and nodes employing the network controller 124, can experience performance bottlenecks over time. Particularly in high data access request volume conditions employing NVMe protocol, the network components can be overwhelmed and consequently provide reduced data access performance to one or more hosts 102. The addition of assorted memory and data tasks that are necessary to maintain data and memory reliability further exacerbates the performance degradation associated with high volume conditions.

Figure 3:
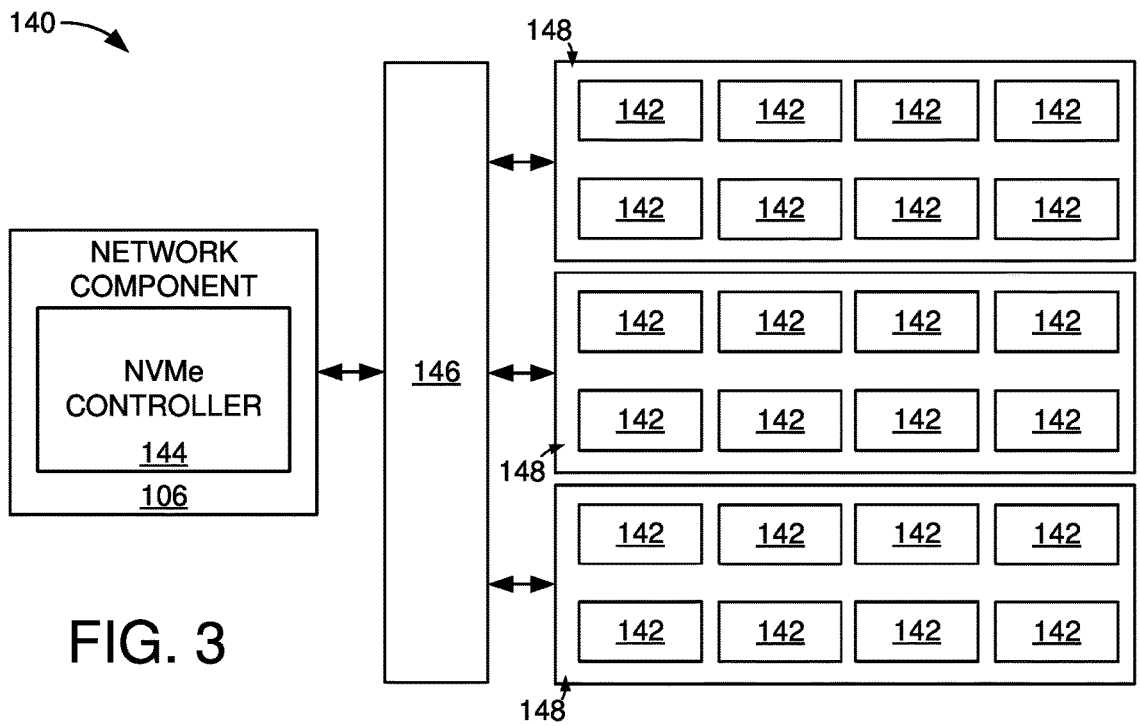
FIG. 3 depicts a block representation of portions of an example data storage system configured and operated in accordance with assorted embodiments.

FIG. 3 depicts a block representation of portions of another example distributed data storage system 140 configured in accordance with some embodiments to employ an NVMe protocol to satisfy host-generated data access requests to, and from, various solid-state memories 142 resident in separate data storage devices 104. The system 140 has an NVMe controller 144 that arranges a number of data queues 146 and namespaces 148 to accommodate the data handling capabilities of the NVMe protocol.

Generally, NVMe is a communications interface and driver that defines a command set and feature set for PCIe-based solid-state drives (SSDs) with the goals of increased and efficient performance and interoperability on a broad range of enterprise and client systems. NVMe was designed for SSD as a layer between the device driver and the PCIe device, standardizing the rules with emphasis on scalability, low latency, and security. NVMe communicates between the storage interface and the System CPU using high-speed PCIe sockets, independent of storage form factor. Input/Output tasks performed using NVMe drivers begin faster, transfer more data, and finish faster than older storage models using older drivers, such as serial ATA (SATA) SSDs. Because it was designed specifically for SSDs, NVMe is becoming the new industry standard for both servers in the data centers and in client devices like laptop, desktop PCs and even next gen gaming consoles.

The standard developed to allow modern SSDs to operate at speeds flash memory is capable of, a sharp advantage with faster read-write. The NVMe SSD enables the flash memory to run directly through the PCI Express (PCIe) serial bus interface as it offers high bandwidth due to being directly attached to the CPU rather than function through the limiting SATA speeds. As SSDs superseded the slower HDDs as primary storage, a fast interface was required to achieve optimal use of the quicker speed capabilities.

That is, NVMe is a technological depiction of the bus, the memory component (SSD) uses to communicate with the computer, and not exactly a new type of memory. A communications interface and driver that outlines a command set and feature set of PCIe based SSD. NVMe technology is available in a number of form factors such as the PCIe card slot, M.2, and U.2, but with all form factors, it directly connects electrically to the motherboard via the PCIe rather than SATA connection.

NVMe, in some configurations, can support multiple I/O queues, up to 64K with each queue having 64K entries. Legacy SAS and SATA can only support single queues and each can have 254 & 32 entries respectively. The NVMe host software can create queues, up to the maximum allowed by the NVMe controller, as per system configuration and expected workload. NVMe supports scatter/gather IOs, minimizing CPU overhead on data transfers, and even provides the capability of changing their priority based on workload requirements. The interface is designed for high scalability and NVM independence to enable next-generation technologies to deliver sustained 4 KB of random accesses over 1 million I/Os per second, which translates to 1 µs or less per command.

NVMe doesn't need the intervening host bus adapter (HBA) and can connect to a higher number of PCIe lanes. A SAS lane runs at 12 Gb per second, which contracts to just about 1 GB per second after overheads. As well, a SATA lane may drop performance to half of that, while a Gen5 PCIe lane runs at 32 Gb per second, or approximately 15.75 GB/s, for four lanes with overhead. Since a SATA SSD runs at and a typical NVMe PCIe Gen5 SSD is configured to use 4 lanes, an NVMe SSD can achieve nearly 32 times higher throughput than the SATA SSD.

It is noted that NVMe is not affected by the ATA interface constrictions as it sits right on the top of the PCI Express directly connected to the CPU. That results in four times faster Input/Output Operations Per Second (IOPs) rivaling the fastest SAS option available. NVMe can deliver sustained read-write speed of 2000 MB per second. NVMe enables drives to benefit from the same "pool" of lanes that directly connect to the CPU, which offers scalable performance by going beyond the conventional four lanes found in most PCIe SSDs and utilize them for added performance. PCIe sockets transfer more than 25 times more data than their SATA equivalent.

However, NVMe storage can have performance issues that result in added cost and inconvenience. For instance, traditional storage controllers, such as flash or HDD controllers, can only handle low levels of I/O processing and create latency and cap performance of NVMe systems. Additionally, the shear number of possible concurrent commands being processed simultaneously risks inefficiency, complexity, excess power consumption, and unwanted processing. Hence, simplification and system optimization that allows for efficient and adaptable NVMe operation can enhance the capabilities and performance of SSDs both alone and in pooled data center environments.

With the capabilities of NVMe, it can be appreciated that the concurrent use of multiple lanes can provide increased performance while suffering from added complexity that jeopardizes the security and reliability of data, at times. As an example, intelligent operation of queues 146 that temporarily hold data before storage into selected logical namespaces 148 can provide maximum operational performance, during some volumes of host-generated data access requests, but have operational bottlenecks that slow data access, delay data rebuilding, and/or delay security operations on data and/or memory during heightened volumes of requests.

Such request dependent performance can be exacerbated by system tasks that function to maintain the reliability of memory and data stored in the memory. That is, the generation, scheduling, distribution, and satisfaction of system tasks, such as security, redundant array of independent disks (RAID), error correction code, firmware, device initialization, data mapping, and metadata operations, can complicate upstream network and/or NVMe controllers 144 to produce one or more performance bottlenecks that slow, delay, and/or cancel completion of system tasks and/or host-generated data access requests.

While the identification of performance bottlenecks can allow for intelligent diversion of system tasks downstream to selected data storage devices for execution, the processing of system tasks downstream can fail to mitigate a bottleneck, particularly during high data access request volume conditions. Hence, assorted embodiments are directed to taking advantage of the configuration of various system 140 components to optimize operational efficiency and mitigate the impact of performance bottlenecks over time.

Accordingly, embodiments are directed to identifying the origin of system components and distributing operational activity to components with known, trusted origins to maintain at least system performance, such as latency, error rate, and overall time to completion, for host-generated data access requests, which provides seamless system operation despite dynamic volumes of activity involving data and/or system memory 142. In other words, the assorted issues associated with NVMe network traffic complexity and inefficiency has prompted the reconfiguration of hardware that has a known, trusted origin to prevent performance bottlenecks and maintain system performance despite relatively high volumes of system activity.

Figure 4:
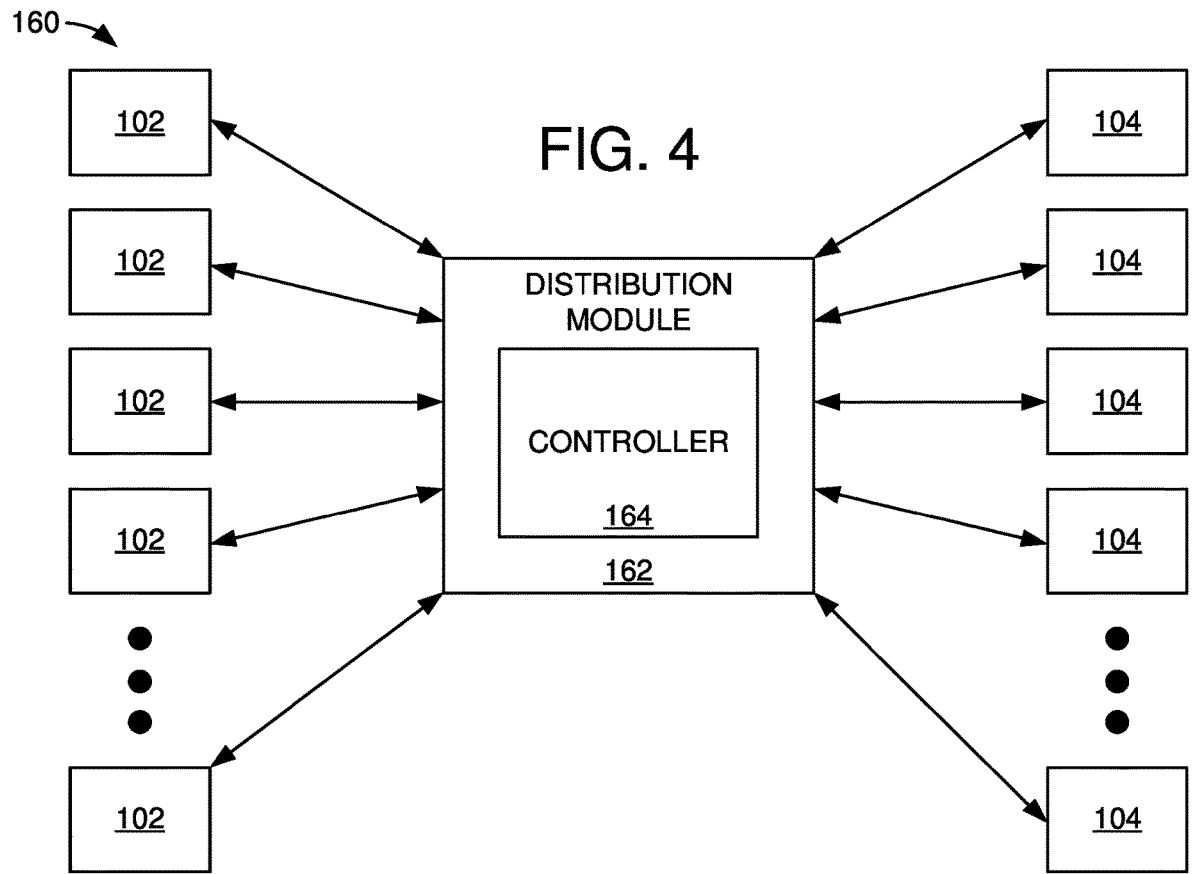
FIG. 4 depicts a block representation of portions of an example data storage system utilized in accordance with various embodiments.

FIG. 4 depicts a block representation of portions of an example distributed data storage system 160 utilized in accordance with various embodiments. Connection of a distribution module 162 to at least one host 102 and at least one data storage device 104 allows for recognition of the origin of the data storage device 104. That is, a controller 164 of the distribution module 162 can passively and/or actively identify an origin of a connected device, such as a manufacturer of the device prior to release to an end-user or an original version of firmware operating on the device. It is contemplated that a device's origin corresponds to the manufacturer of some device hardware, such as the controller, memory, bus, port, lane, channel, motherboard, or system-on-chip (SoC).

The connection of familiar data storage components, such as data storage devices, network controllers, and network nodes allows for the use of trusted data and/or processing channels/lanes. Such dedicated aspects can be employed, in some embodiments, for selected system tasks, such as cryptographic operations, error correction code assignment, error correction code utilization for data rebuilding, RAID operations, firmware upgrades, security operations, and device initializations. The dedication of a channel/lane for a selected tasks and operations can enhance security as well as increase operational efficiency as complex operations can be conducted exclusively. The ability to dedicate a channel/lane for selected tasks further allows NVMe protocol to be employed without jeopardizing data or memory security or process flow.

Recognition of a device's manufacturing origin, in other embodiments, allows hardware to be utilized for a variety of purposes that are unavailable, or ill-advised, when the hardware has an unknown, untrusted origin. For instance, supplemental controllers, cache, switches, and/or connections can be activated and utilized without concern for incompatibility, firmware alterations, or security mismatches. It is contemplated that hardware from known manufacturing origins can be dynamically assigned functions and tasks by the distribution module 162 in response to changing operational conditions. The use of NVMe protocol for known origin components, such as an NVMe switch, can provide enhanced capabilities and/or performance that would otherwise not be capable with non-trusted components with unknown origins and/or operational configurations.

Through the passive recognition of hardware manufacturing origin, component initializations and security protocol can be streamlined. That is, a trusted, known origin component allows some, or all, of a component's initialization to be skipped, ignored, or abbreviated. Knowing that a component is trusted and/or has a common operating/security/communication protocol allows the component to be utilized more efficiently than if normal component initializations were conducted. The initialization-less component connection can be employed for dedicated NVMe operation that is unimpeded by initializing the component into the system, building a security profile, and loading firmware.

Other embodiments enabled by the recognition of trusted component with a known manufacturing origin involve sharing data storage functionality that would, otherwise, require re-initializing a non-trusted component to have matching operational and security protocol. Particular embodiments can be directed to shared RAID configurations/functions, error correction, security authentication, drivers, processing, or caching. Sharing functionality among components with known origins can be specifically optimal in distributed systems that employ data storage devices from different brands. For example, known origin components can identify one another and establish optimized functionality independent, and potentially autonomously, of unknown component origins, such as NVMe data access request execution, queue management, garbage collection, or metadata protocol.

The intelligence and efficiency provided by the circuitry of the distribution module 162 allows for both passive and active evaluation of a system component 104 to identify and/or predict the component's origin. For instance, the distribution module 162 can passively monitor activity of a component 104 to predict and/or detect what manufacturer released the component 104, what firmware was initially installed on the component 104, and what hardware is present in the component 104, which can be generally characterized as the manufacturing "origin" of the component 104. It is noted that "passive" evaluation of a component 104 is not limited to a particular procedure or timing, but can consist of evaluating operational parameters while the component 104 operates to complete other system tasks and/or host-generated data access requests. Conversely, "active" evaluation of a component 104 can consist of testing of the component 104 with test patterns of data and/or signals generated by the distribution module 162 to identify operational parameters and configurations that indicate the origin of the component 104.

Figure 5:
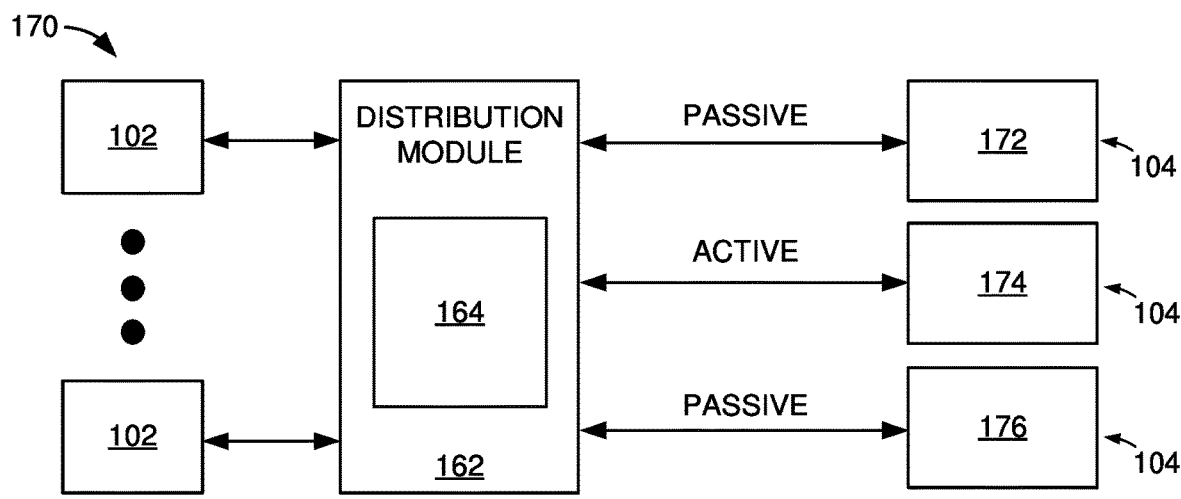
FIG. 5 depicts a block representation of portions of an example data storage system operated in accordance with some embodiments.

FIG. 5 depicts a block representation of portions of an example distributed data storage system 170 that utilizes a distribution module 162 to evaluate and identify the origin of connected hardware. The system 170 can have any number of hosts 102 connected to any number of data storage devices 104 through one or more network components as well as circuitry of the distribution module 162. The devices 104 can have similar, or dissimilar, configurations, such as memory type, capacity, speed, reliability, and origin.

In the non-limiting example of FIG. 5, a first data storage device 172 has previously been connected and utilized by the system 170 without having a manufacturing origin evaluation. Meanwhile, a new data storage device 174 is connected to the system and a third data storage device 176 has had less than all of its hardware identified by manufacturing origin. The distribution module 162 can intelligently determine how and when the various unidentified hardware of the system 170 are identified. It is noted that the data storage system 170 can operate for any amount of time with unidentified constituent hardware.

In accordance with various embodiments, the distribution module 162 can decide if hardware origin evaluation is to be conducted and, if so, will such evaluation be passive or active. A passive origin identification involves monitoring hardware activity over time during the execution of commands, requests, and tasks not specifically directed to origin identification. That is, passive origin evaluation does not generate any specific commands or requests to determine hardware origin and, instead, monitors satisfaction of general device 104 activity for operational parameters that indicate hardware origin. For instance, passive identification can monitor one or more operational metrics, such as power consumption, latency, overall time to completion, and maximum speed, along with operational configurations, such as generated error correction code, parity, metadata, and encryption, to determine what manufacturer created the hardware.

The correlation of passively attained operational activity of hardware can accurately identify what manufacturer created the hardware due to understood manufacturer behavior and/or performance that is unique. For example, evaluation of the latency of assorted data access requests to a memory can indicate the manufacturer (origin) of the memory, a device bus, or signal channel. It is contemplated that multiple different aspects of hardware operation can be utilized to identify the origin of hardware. Some embodiments initially predict the origin of hardware and subsequently discover operational activity that confirms, or negates, the predicted origin.

The passive identification of the manufacturing origin of hardware can be less processing intensive than active origin testing, but can take greater time as the distribution module 162 may wait for commands and/or requests to provide information that can be used to identify hardware origin. In contrast, active origin identification can be faster, and potentially more accurate than passive identification, but at the cost of greater processing burden on the system 170. That is, active hardware origin identification involves a unique testing procedure where operational aspects of hardware are evaluated independently from commands, requests, and tasks generated by other aspects of the system 170. Active origin identification can generate data, commands, and signals to sequentially, or redundantly, poll the operational performance and/or capabilities of hardware, which indicates which manufacturer released the hardware for end-user use.

The non-limiting example of FIG. 5 illustrates how the distribution module 162 can conduct different origin identification protocol for different aspects of a data storage system 170. The intelligent evaluation of available system 170 capabilities with respect to pending data access requests, system tasks, and logged device 104 behaviors allows the distribution module 162 to select an origin identification protocol that operates without degrading average data access performance over time, which provides a seamless origin identification to a connected host 102. In other words, the distribution module 162 can choose and adapt how hardware origin is identified to ensure average data access performance, such as latency and time to completion, does not decrease while hardware is evaluated. The ability to adapt to different protocol in response to changing conditions further enables the distribution module 162 to intelligently recognize the origin of hardware and optimize the connection of known, trusted devices.

Through the recognition of hardware manufacturing origin, the distribution module 162 can identify opportunities for operational optimizations that take advantage of known aspects of hardware from trusted manufacturers. The intelligent use of active or passive hardware origin identification without degrading system performance begins system optimization that leverages known aspects of hardware origin to increase capabilities and performance over time. One such optimization can be the diversion of system tasks to hardware with known origins that can satisfy both assigned tasks and host-generated data access requests without degrading average system performance.

Figure 6:
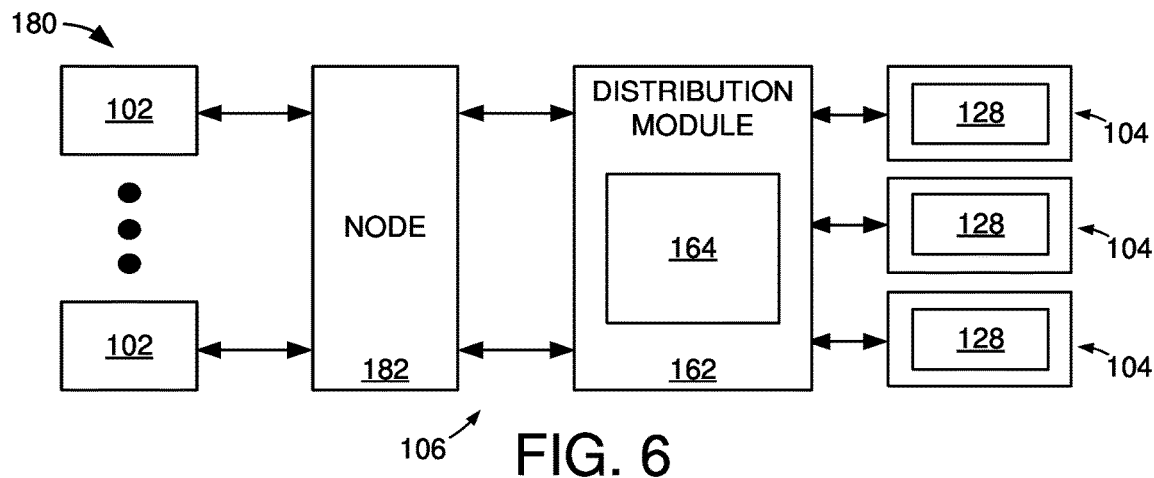
FIG. 6 depicts a block representation of portions of an example data storage system carrying out assorted embodiments.

FIG. 6 depicts a block representation of portions of an example distributed data storage system 180 that handles operational bottlenecks in accordance with various embodiments. A network 106 can consist of any number, and type, of hardware that are configured to direct the flow of data, commands, and requests between hosts 102 and memory 128 of data storage devices 104. The network, in some embodiments, consists of a node 182, such as a server, router, switch, or other programmable circuitry, connected to a distribution module 162 that identifies the manufacturing origin of connected system hardware as well as system operations that can be distributed from upstream network components to downstream devices 104 for completion. That is, the distribution module 162 can change what system component completes a system operation to prevent, or at least mitigate, the development of operational bottlenecks.

In system embodiments, the distribution module 162 is inactive or otherwise non-functional. Such situations can result in operational bottlenecks in the network 106 as operations necessary to provide maximum performance, or maintain consistent average performance over time, accumulate without being satisfied, particularly when the computing capabilities of downstream data storage devices 104 are not utilized. For instance, system operations can involve the partial, or complete, initialization of newly connected hardware. System operations may, alternatively, involve organizing logical groupings of data and/or data addresses, such as namespaces, garbage collection units, and overprovisioning.

Network system components may, in other embodiments, involve changing existing system settings, such as parameters associated with buffer schemes, mapping, metadata, garbage collection, namespaces, or error correction. It is contemplated that system operations can involve generating information, such as with RAID activity that mirrors, stripes, creates parity data, and maps data across separate data storage devices 104. It is noted that the actual execution of system operations is not the entirety of the involvement of network components as system operation opportunity identification, scheduling, initiation, and verification can add processing demand and time to the actual resources required by the satisfaction of the system operation. Additionally, many system operations correspond with reducing the operational capabilities of downstream data storage devices while new parameters, settings, or configurations are established, which often results in unsatisfied data access requests accumulating upstream and further exacerbating the performance degradation of satisfying system operations, particularly in high data access request volume conditions.

Figure 7:
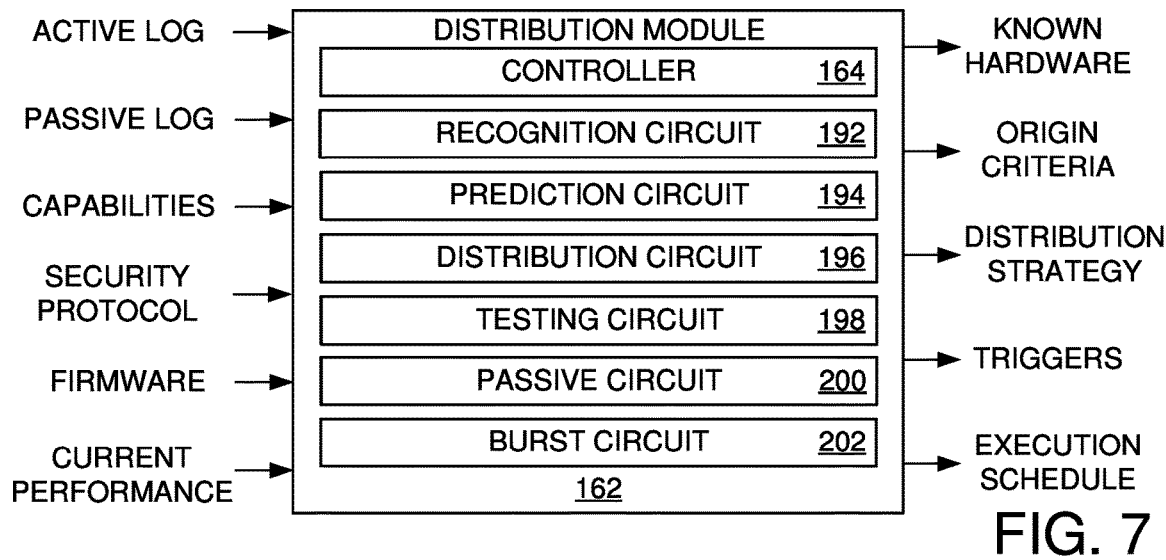
FIG. 7 depicts a block representation of a distribution module that may execute various embodiments in a distributed data storage system.

FIG. 7 depicts a block representation of an example distribution module 162 that can be employed in a distributed data storage system in accordance with various embodiments. The module 162 can be configured as hardware resident in any aspect of a data storage system. As an example, the module 162 can be circuitry of a printed circuit board located alone and connected to assorted components of a system or positioned within a component of the system, such as a host 102, network component 106, or data storage device 104.

A distribution module 162, in some embodiments, has a local controller 164 that processes input information, such as logged system activity, pending requests, system configurations, and component capabilities, to generate an optimization strategy that utilizes strategically selected aspects of the system to take advantage of known, trusted components to provide consistent and reliable data access performance over time. The module controller 164 can operate alone, or in conjunction with a recognition circuit 192 to passively, or actively, evaluate the operating parameters of a system component to determine an origin of the component.

Various embodiments of the recognition circuit 192 translate various input information about system data, hardware, configuration, operation, and performance to select between active and passive identification of the origin of system components. That is, the recognition circuit 192 can proactively generate tests and/or procedures to either passively identify a component's origin by evaluating selected operating characteristics, such as latency, input/output per second, average completion time, assigned error correction, and security protocol, or conduct at least one pattern of test signals/data generated by the recognition circuit 192 to actively determine the manufacturer and/or original firmware of the component. The ability to intelligently select between active identification and passive identification allows the distribution module 162 to balance time for identification of origin with amount of system processing resources utilized during identification.

It is noted that passive identification of a component's manufacturing origin can involve the correlation of predetermined criteria generated by the distribution module 162 with operational characteristics and/or performance passively attained while the component is carrying out data access requests and system tasks. The predetermined criteria, in some embodiments, consists of operational characteristics that correspond with a component's origin, such as assigned metadata, mapping, error correction code, or encryption. As such, the distribution module 162, and recognition circuit 192, can maintain the criteria over time to ensure the accurate and efficient identification of a component's origin, which enables the distribution module 162 to optimize the utilization of dormant and/or throttled aspects of the system to take advantage of the known, trusted operating characteristics of the component.

While assorted embodiments select to actively, or passively, identify a component's origin, the distribution module 162 may, alternatively, translate system information into a forecasted component origin. For instance, the distribution module 162 may utilize a prediction circuit 194 to translate collected operational information into a predicted component origin, which provides a less accurate origin determination than active or passive origin identification, but with less processing requirements. The prediction circuit 194 can employ logged system data, model data from other data storage systems, and theoretical operational data to predict what operational activity of a system component indicates the component's origin, such as NVMe namespace assignment, caching scheme, security protocol, metadata assignment, or data encryption.

The use of the prediction circuit 194, in various embodiments, forecasts test patterns of data and/or system signals to increase the efficiency and/or accuracy of active component origin identification. It is contemplated that the prediction circuit 194 forecasts the manufacturing origin for hardware and/or the capabilities, operating parameters, settings, protocol, and default keys for hardware/devices that allow the distribution module 162 to identify one or more system operations to be carried out by the downstream hardware. Hence, the distribution module 162 can utilize the characteristics corresponding to a known hardware manufacturing origin as well as the characteristics of hardware with predicted manufacturing origin to generate a distribution strategy that prescribes what operations to send from upstream network components to downstream hardware for execution, when to schedule the delivery of such operations to the downstream hardware, and where to send the selected system operations.

Generation of one or more distribution strategies may involve a distribution circuit 196 that can operate independently, or concurrently with other module circuitry, to correlate known, or predicted, hardware manufacturing origins with system operations that can be diverted from upstream network component processing and execution to downstream hardware. The distribution circuit 196 can continuously, sporadically, or routinely evaluate existing distribution strategies to determine if the prescribed distribution of system operations is optimized for the current, and predicted, volume of host-generated data access requests and/or pending system operations. For instance, the distribution circuit 196 can determine if existing strategy actions provide maximum and/or consistent performance, such as access latency, overall time to complete, or volume of available processing resources, as system operations are diverted downstream for execution in hardware with known/predicted manufacturing origins.

While logged system activity can provide the distribution module 162 with sufficient information to identify a known manufacturing origin or predict the operating capabilities and characteristics of hardware with unknown manufacturing origin, a testing circuit 198 can conduct activity to verify a previous module prediction of manufacturing origin, hardware capability, or hardware default setting. The testing circuit 198 can generate one or more tests, in some embodiments, that evaluate one or more parameters of downstream hardware. As a non-limiting example, the testing circuit 198 can create one or more test patterns of data accesses that are executed by a selected downstream hardware component to provide the distribution module 162 with component information regarding at least operating parameters, capabilities, and default protocol.

The testing circuit 198 may conduct one or more tests of a downstream hardware component to verify a predicted manufacturing origin, operating capability, and/or installed protocol for the component. It is contemplated that the test circuit 198 generates multiple different tests that can be selectively executed alone, or in conjunction with host-generated data access requests, to determine various aspects of the connected component, such as type of component, capabilities, performance, and default settings. Some embodiments of the testing circuit 198 utilize pending host-generated data access requests to determine assorted aspects of a downstream hardware component, such as manufacturing origin, operating capabilities, and/or default settings, which effectively piggyback on the satisfaction of host-generated data access requests without conducting additional activity.

Operation of the testing circuit 198 can result in information that is utilized by the distribution module 162 to determine optimal conditions and timing for distribution of system operations downstream as well as whether system operations are to be executed passively or actively by the destination downstream hardware component. That is, the distribution module 162 can identify assorted operational triggers from known, predicted, tested, and/or verified component information to prompt one or more system operations to be sent to a downstream component and executed by the downstream component.

The assignment of passive execution of a system operation by a downstream hardware component can coincide with one or more operations pending for satisfaction by a component until a set event, condition, and/or time. With a passive system operation designation, one or more system operations can be assigned to downstream components without being immediately executed, which allows the downstream component to operate and satisfy preexisting, non-system operations, such as host-generated data access requests that read and/or write data to a memory of a downstream data storage device.

While any circuitry of the distribution module 162 can assign passive status to system operations, various embodiments empower a passive circuit 200 to complement a distribution strategy with details about the assignment and satisfaction of system operations passively by downstream components of a distributed data storage system. That is, a passive circuit 200 can generate assorted aspects of one or more distribution strategies that prescribe when and how passive execution of system operations are to be conducted by selected downstream hardware components. For example, the passive circuit 200 can proactively designate, in a distribution strategy, what downstream component is to conduct passive execution of a system operation, when the selected component is to execute the assigned operation, and how assigned operations are to be completed passively without degrading performance of servicing non-system operations, such as host-generated read and/or write requests.

The independent configuration of the passive circuit 200 may allow for continuous, responsive, and/or random evaluation of passive aspects of a distribution strategy to determine if the prescribed destination component, timing, triggers, and passive completion instructions are optimal for current, and predicted, system conditions, such as request volume, error rate, average performance, and alteration of the number and/or type of connected downstream components. The ability to adapt previously prescribed passive operation assignments and/or instructions allows the distribution module 162, and generated distribution strategies, to be dynamic and remain optimal for system conditions over time, which ensures performance metrics, such as average request completion time, latency, error rate, and/or consistency.

While not required or limiting, embodiments can characterize system operations as commands, requests, and actions not initiated by a host. For instance, a system processor can create any number, and type, of system operations, such as generation of RAID parity, RAID striping, RAID mirroring, compression, encryption, garbage collection, hardware initialization, firmware updates, security verification, namespace management, error recovery assignment, data mapping, metadata generation, metadata management, and error recover execution, that may be characterized as non-host activity that are needed to operate one or more downstream data storage devices of a system.

It is noted that the passive circuit 200 can generate, and maintain, any number of passive system operation instructions that are stored in a distribution strategy. As an example, the passive circuit 200 can analyze current and/or predicted system conditions and pending activity to create one or more operational triggers to prompt the distribution of system operations downstream, the execution of distributed operations, and the evaluation of passive execution to verify passive execution was optimal. With these assorted strategy aspects created by the passive circuit 200, instead of the distribution circuit 196, the module 162 has bandwidth and processing capabilities to evaluate and execute non-passive system conditions, as prescribed by a distribution strategy.

Just as system operations can be evaluated and prescribed passive execution by the passive circuit 200, a burst circuit 202 can generate distribution strategy triggers and steps to provide maximum possible performance for the satisfaction of host-generated data access requests. The burst circuit 202 can assign how many, and which, downstream data storage devices are to be selected to execute host-generated data access requests to provide the maximum available performance, such as execution consistency over time, latency, average overall time to completion, or error rate. It is contemplated that operation of burst commands coincide with moving assigned system operations to a passive status where host requests are completed prior to starting system operations.

Some embodiments of the operation of the burst circuit 202 involve reordering and/or rescheduling pending system operations to provide maximum performance for host-generated requests, such as data reads, writes, and moves. The burst circuit 202 can prescribe one or more alterations to where system operations and/or pending requests are assigned to increase the performance capability of one or more downstream system components, such as a data storage device. For example, the burst circuit 202 can generate reordering or rescheduling of pending system operations and/or host-generated data access requests to a single downstream system component, or multiple separate system components, to free processing, buffer, memory, and/or channel to execute assigned host-generated data access requests with maximum potential performance, such as time to completion, latency, or error rate.

It is contemplated that the burst circuit 202 prescribes alterations to existing system operation to dedicate hardware to a selected activity. As a non-limiting example, the burst circuit 202 can populate a distribution strategy with operational alterations that dedicate system hardware, such as a lane, channel, port, bus, system on chip (SOC), processor, or buffer, to execute designated host-generated data access requests. The dedication of system hardware for a prescribed amount of time allows the downstream components to utilize all available processing and execution resources to the satisfaction of assigned host-generated data access requests with the greatest possible operational performance.

Figure 8:
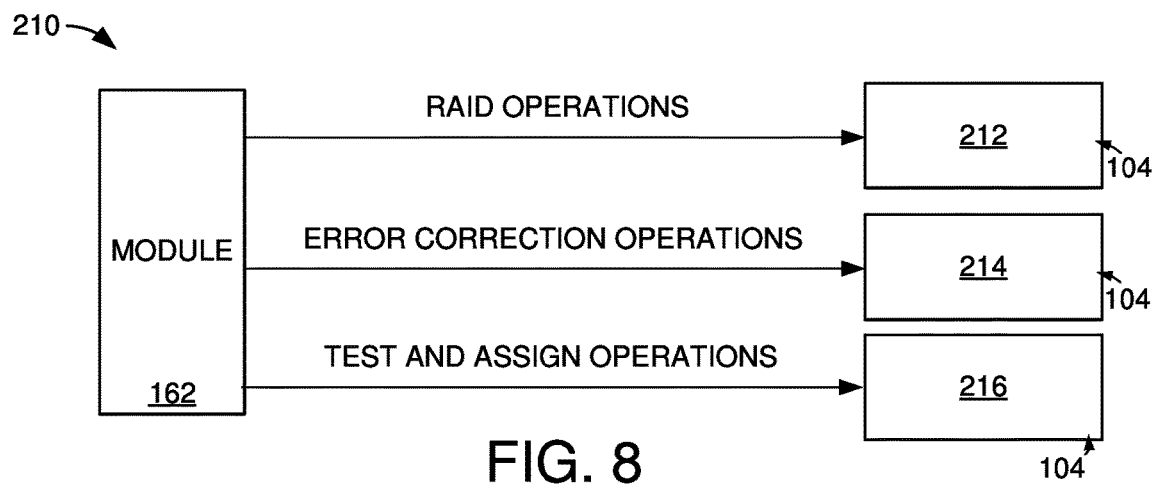
FIG. 8 depicts portions of an example data storage system employed in accordance with assorted embodiments.

With the assorted and diverse capabilities of the distribution module 162, distribution strategies can be generated, and updated over time, to provide alterations to the operating parameters of at least one system component to provide dynamic optimization of available system resources to maintain system performance metrics despite changing volumes of pending operations and requests. FIG. 8 depicts a block representation of portions of an example distributed data storage system 210 that utilizes a distribution module 162 in accordance with various embodiments. The distribution module 162 can generate one or more distribution strategies that respond to the active, or passive, identification of the manufacturing origin of connected system components by sending at least system operations for execution from upstream network components to downstream components, such as the data storage devices 104 shown in FIG. 8.

As a result of detected, and/or predicted, system conditions, such as pending request volume, pending system operation volume, available processing capacity, and available buffer capacity, the distribution module 162 can carry out the distribution of system operations, as prescribed by a distribution strategy. The non-limiting example shown in FIG. 8 illustrates how the discovery, or prediction, of a connected downstream device 212 with a known manufacturing origin can prompt RAID system operations to be diverted from upstream to be executed by the downstream device 212. The known operating and/or default parameters and settings of the device 212 with a known manufacturing origin allows the distribution module 162 to transfer processing intensive system operations associated with establishing and maintaining RAID data arrangement without burdening the processing capability of upstream network components.

It is contemplated that the distribution strategy can prescribe dedicated operations for downstream devices with known manufacturing origins. As such, the distribution module 162 can dedicate the selected downstream device 212 to the execution of the assigned system operation, which may delay or move other system operations and/or data requests. The distribution module 162 may concurrently, or sequentially, execute other system operation diversions from one or more distribution strategies. For example, the distribution module 162 can carry out the distribution of error correction operations to a second data storage device 214 with a known manufacturing origin. Such error correction operations can involve the generation of error correction codes for host-generated data and/or the use of existing error correction codes to recover data having an error or failure.

The ability to direct system operations from upstream system components to downstream devices 212/214 for execution, along with the ability to assign when and how the operations are carried out by the selected devices 212/214 allows the distribution module 162 to optimize system 210 performance over time by balancing when and how system operations are conducted to preserve processing and memory capacity that ensures overall system performance can be maintained. In other words, the distribution module 162 can organize, schedule, and execute system operations in conjunction with host-generated data access requests to level-load system resources, such as processing, memory, and buffer capabilities.

In accordance with some embodiments, the distribution module 162 can segregate downstream hardware, such as devices 212/214 with known manufacturing origins, for high priority activity. For instance, devices 212/214 with known manufacturing origins can have pending requests and/or operations moved or rescheduled so that only a selected, high priority activity is conducted, such as encryption, firmware upgrade, or writing of sensitive data.

The knowledge of what default capabilities, protocol, and settings are installed by the manufacturer in known devices 212/214 allow the distribution module 162 to customize existing and/or pending system operations and/or data access requests to utilize the default aspects of the devices without formatting, initializing, or installing new/different software, firmware, schemes, or protocol. It is contemplated that customizing system operations divides a single operation into a plurality of separately executable sub-tasks that can be distributed and uniquely scheduled for execution by multiple different downstream data storage devices. Such customization and generation of sub-tasks may also allow for involvement of upstream network hardware, albeit with reduced processing resource requirements compared to if the system operation was not divided.

It is expected that the distributed data storage system 210 will connect to a data storage device 216 that has an unknown manufacturing origin, which corresponds with unknown default operating parameters, capabilities, and protocol. While an unknown manufacturing origin can prompt the distribution module 162 to install and/or initialize system information into the device 216 to ensure each connected downstream device operates with common parameters, settings, protocol, and/or schemes, some embodiments refrain from installing system information and settings in lieu of testing the unknown hardware 216 over time to determine operational aspects that can be utilized without a complete initialization of the device 216.

As a non-limiting example, the distribution module 162 can generate and/or execute one or more tests, which may involve data reads, writes, moves, or refreshes, to determine the existing performance, operating parameters, settings, and protocol of the device 216 with unknown manufacturing origin. A test, in some embodiments, is conducted prior to satisfying any host-generated data access requests while other embodiments selectively execute some data access requests in conjunction with one or more test data patterns to determine the existing operating aspects and capabilities of the device 216. Conducting a test pattern, with or without satisfying host-generated data access requests, can be considered active testing while various embodiments can conduct passive testing by monitoring the satisfaction of host-generated data access requests without conducting any additional operations to determine the capabilities, settings, and protocol of the device 216 over time.

With the intelligent testing/monitoring of a device 216, the distribution module 162 can determine what system information needs to be installed to conform device 216 operation with acceptable security, reliability, and performance standards. That is, the distribution module 162 can determine that preexisting device 216 settings, protocol, and parameters can be employed to service host-generated data access requests, which reduces the processing and time overhead in bringing the device 216 into full service for the system 210. The ability to utilize preexisting device 216 operational aspects allows the system 210 to concurrently utilize greater numbers of hardware with unknown manufacturing origin as processing overhead for upstream network hardware is reduced when system operations are transferred for execution to the downstream hardware.

Figure 9:
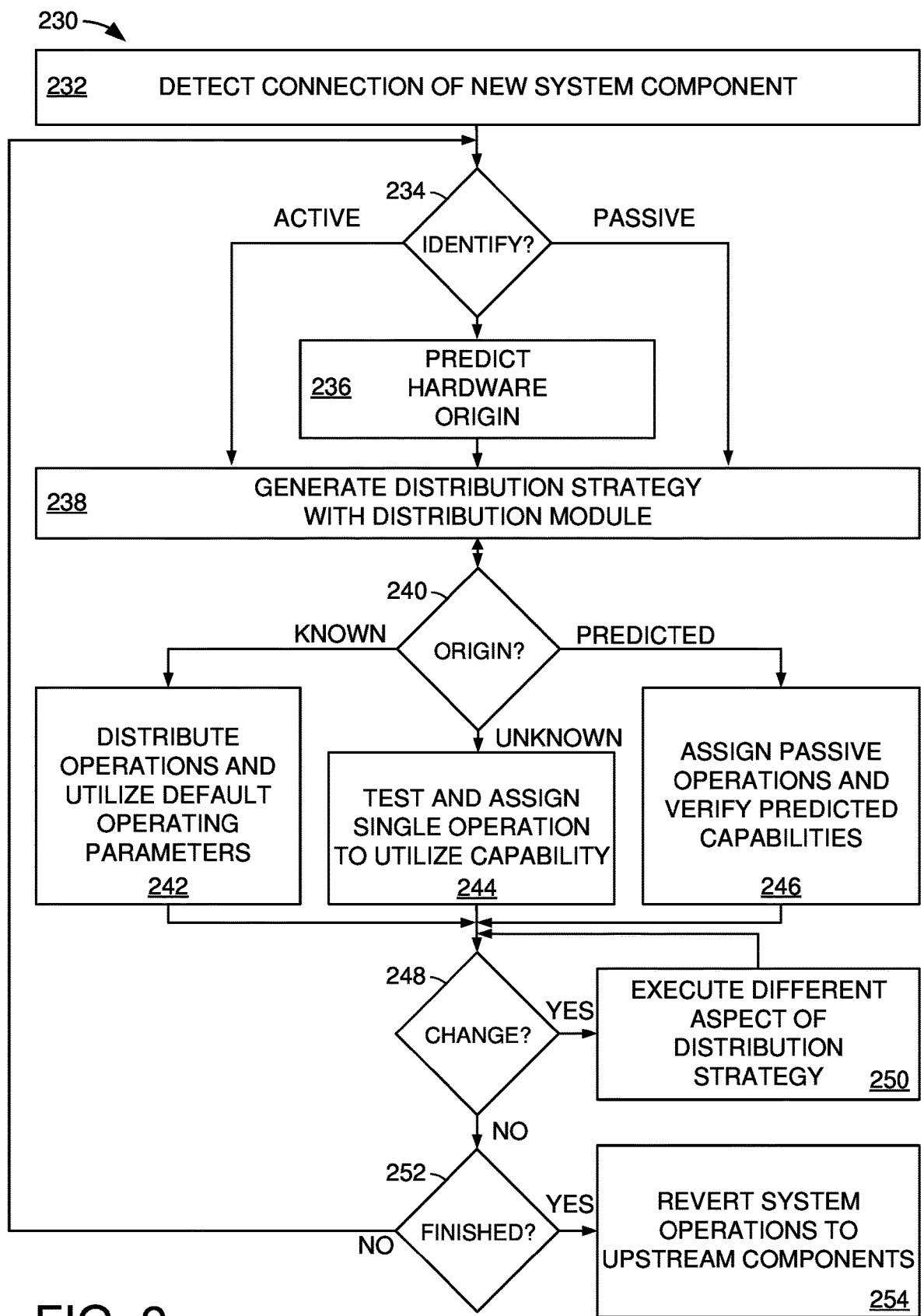
FIG. 9 is a flowchart of an example distribution routine that can be executed with the respective aspects of FIGS. 1-8 in accordance with assorted embodiments.

FIG. 9 conveys a flowchart of an example distribution routine 230 that can be carried out with assorted embodiments of the distributed data storage systems in FIGS. 1-8. Upon connection of various hosts to data storage devices via a distribution module, step 232 detects at least one hardware aspect that has an unidentified origin. The distribution module proceeds, in decision 234, to determine if, how, and when, hardware is to be identified. For instance, decision 234 can evaluate if active testing of hardware or if passive activity monitoring for hardware manufacturing origin identification provides desired system performance, reliability, and security. That is, decision 234 can compare the real-time capabilities of the system with the requirements of active and passive hardware manufacturing origin identification to determine when and how hardware origin can be determined without degrading system averages.

Alternatively, decision 234 can determine that system resources cannot maintain desired levels over time by conducting either passive or active hardware manufacturing origin evaluation. As such, decision 234 prompts step 236 to predict the manufacturing origin of hardware with the distribution module based on logged and/or model system information. The detection, or prediction, of the manufacturing origin of hardware allows the distribution module to generate a distribution strategy in step 238 that identifies what system operations can be diverted from upstream components to downstream components for execution. It is noted that a distribution strategy created in step 238 can comprise any number of operational triggers to prompt the reorganization, delay, and execution of system operations by downstream components with known, predicted, or unknown manufacturing origins, respectively.

In other words, a distribution strategy can prescribe passive or active satisfaction of assigned system operations by the processing capabilities of downstream system components. The distribution strategy, in some embodiments, are directed to particular manufacturing origins, which corresponds with a distribution module generating multiple different strategies with different triggers, assigned operations, and execution schedules.

At any time after a distribution strategy is created, the distribution module can begin executing one or more strategies for downstream hardware with known, predicted, and unknown manufacturing origins, as determined by decision 240. For downstream hardware actively, or passively, identified with a known manufacturing origin, step 242 utilizes one or more preexisting, manufacturer installed, operating parameters to satisfy at least one system operation diverted from upstream network components.

The execution of step 242 can involve conducting any number and type of modification to the operational queue of a downstream device with a known manufacturing origin, as prescribed by a distribution strategy. For instance, a distribution module can move, delay, or expedite one or more host-generated data access requests to allow the processing capabilities of the downstream hardware to conduct and complete an assigned system operation. It is contemplated that step 242 executes a burst mode aspect of a distribution strategy that dedicates downstream hardware for satisfaction of host-generated data access requests, which may involve moving, reordering, or delaying previously scheduled requests, commands, and/or operations to one or more downstream data storage devices.

The utilization of downstream hardware with known manufacturing origin, in some embodiments, divides one or more system operations diverted from upstream network components into sub-tasks that are separately scheduled and executed. As a non-limiting example, the distribution strategy can divert a system operation from an upstream server to a downstream device with a known manufacturing origin before dividing the operation into sub-tasks that can be separately scheduled and executed by one or more downstream devices. The ability to intelligently divide, move, schedule, and execute a system operation with sub-tasks allows for leveling of the use of processing resources across the downstream system devices, which can improve the capability of a system to service new hosts, devices, and/or requests with at least average performance, such as latency, error rate, or overall time to completion.

In the event that decision 240 determines that a downstream component has an unknown manufacturing origin, step 244 executes a portion of a preexisting distribution strategy that mitigates the risk of degradation of system performance, reliability, and/or security. For instance, step 244 can format some, or all, of the downstream component to install setting, software, firmware, protocol, and/or schemes that conform component operation with standards and/or default parameters of the distributed data storage system. The installation of common system operating parameters allows the hardware component to have known settings and protocol, but involves heightened processing as the component undergoes such installation process.

A component with unknown manufacturing origin may be utilized, with or without installation of common operating parameters/settings, to satisfy particular system operations. For example, the distribution module can divert operations involving RAID, garbage collection, or data mapping to a component with unknown manufacturing origin. Diverting system operations in step 244 may correspond with a detected, or predicted, processing capabilities of the component itself or the system as a whole. That is, the distribution module can react to processing capacity over time by sending system operations to downstream components with unknown manufacturing origin.

Some embodiments react to the determination of an unknown component manufacturing origin in step 244 by altering the type of data access requests serviced by the component. For instance, step 244 can assign an unknown manufacturing origin component as a buffer for other downstream memories or as archival storage of data that is less frequently accessed compared to other user data. It is contemplated that a distribution module can alter an unknown component to solely execute sequential writes, sequential reads, random writes, or random reads, which can alleviate processing overhead for other downstream components.

Although it is contemplated that a connected component of a distributed data system can be utilized agnostically with regard to manufacturing origin, various embodiments utilize the distribution module to predict various aspects of a connected component corresponding to manufacturing origin. As an example, the distribution module can predict a manufacturing origin and/or operating parameters of a connected component to allow for the optimization of operating parameters for the component alone or the system as a whole. It is noted that the prediction of component capabilities, settings, parameters, and/or protocol may involve the execution of one or more test patterns generated by the distribution module, which may involve data reads, data writes, data moves, and/or data refreshes.

Regardless of whether a component capability, setting, and/or operating parameter is predicted as a result of executing test patterns, or not, the distribution module in step 246 can execute a distribution strategy to verify predicted component aspects while executing system operations and/or host-generated data access requests. It is contemplated that the distribution module diverts one or more system operations to a downstream component with a predicted manufacturing origin and sets the operations for passive execution with pending host-generated data access requests. In other words, predicted component aspects can be verified in step 246 by logging satisfaction of host-generated data access requests while assigned system operations are delayed.

Such passive system operation satisfaction allows the distribution module to confirm a prediction, which provides validation that the assigned system operation is optimized for the component. In contrast, passive system operation execution allows the distribution module to revoke an incorrect prediction before a sub-optimal system operation is carried out by the component. While a downstream component with predicted aspects may conduct assigned system operations actively with host-generated data access requests concurrently, or sequentially, the ability to verify predicated aspects of a component provides the distribution module with information to improve future predictions. For instance, the distribution module can utilize past predictions to improve future predictions about similar, or dissimilar, capabilities, settings, and protocol of connected downstream hardware.

The routine 230 can execute one or more distribution strategies for one or more connected downstream system components with steps 242, 244, and 246 concurrently or sequentially. The assorted steps can be conducted for any amount of time. However, it is contemplated that the distribution module evaluates, in decision 248, if a different distribution strategy would provide improved system performance, reliability, and/or security. For instance, a distribution module can utilize a prediction circuit to evaluate the hypothetical execution of one or more distribution strategies, and the constituent diversion of system operations to the downstream component for execution, to determine if the current strategy and assigned system operation(s) are optimal.

If an improvement to system efficiency, performance, security, or reliability can be achieved, at least predicted to be achieved, in decision 248 one or more different system operations are assigned in step 250 to the downstream system component as part of different distribution strategy. The evaluation of assigned system operations as part of selected distribution strategies can be conducted cyclically with step 250 any number of times.

Once an existing distribution strategy, and corresponding assigned system operation(s), are found to be optimal in decision 248, an evaluation of overall system performance and capabilities is undertaken in decision 252. For instance, the distribution module can determine, with decision 252, if diverting system operations downstream provides improved performance, security, or data reliability. If so, routine 230 returns to the evaluation of connected components in decision 234. In contrast, a determination in decision 252 that execution of a distribution strategy provides no improvement prompts the distribution module to revert system operations execution to upstream network components, which leaves the downstream components to satisfy commands and requests from one or more system hosts.

Through the detection, or prediction, of the manufacturing origin of a component of a distributed data storage system, a distribution module can divert system operations that intelligently utilize the resources of the system. By employing known, manufacturer installed, aspects of a component, the distribution module can provide optimized system operation without taking a component offline to install new software, firmware, and/or operational parameters. The intelligent utilization of operational aspects of a component from a known, or predicted, manufacturing origin can equalize processing resources across a system. The diversion of system operations to downstream components allows upstream network components greater available resources to accommodate and service connected host requests and commands.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
connecting a host to a device and a distribution module;
identifying a manufacturing origin of the device with the distribution module by passively monitoring at least one operational metric of the device during completion of a plurality of host-generated data access requests to transfer data between the host and a memory of the device and correlating the at least one operational metric to predetermined, unique device behavior associated with a known manufacturer of the device independently of a separate manufacturing origin identifier data value that identifies the known manufacturer;
diverting a system operation from an upstream component connected to the distribution module to the device in response to the identified manufacturing origin of the device; and
utilizing a manufacturer installed operating parameter of the device to complete the system operation.

2. The method of claim 1, wherein the at least one operational metric of the device comprises an elapsed time during which the device executes the plurality of host-generated data access requests.

3. The method of claim 1, wherein the distribution module identifies the manufacturing origin by monitoring an elapsed time to complete each of the plurality of host-generated data transfer requests by the device over time.

4. The method of claim 1, wherein the manufacturer installed operating parameter of the device is a unique capability of devices sharing the identified manufacturing origin from the known manufacturer and is unavailable in devices that do not share the identified manufacturing origin and are thus fabricated by a different manufacturer.

5. The method of claim 1, wherein the identified manufacturing origin is subsequently confirmed by subsequently polling the device and receiving the separate manufacturing origin identifier data value therefrom.

6. The method of claim 1, wherein the distribution module identifies the manufacturing origin of the device by comparing the passively monitored at least one operational metric of the device to understood manufacturer performance metrics that are unique to the manufacturing origin of the device.

7. The method of claim 1, wherein the at least one operational metric comprises an observed power consumption, latency, overall time to completion, a maximum speed, an input/output per second data transfer rate, or an average completion time of the device during processing of at least one command.

8. The method of claim 1, wherein the manufacturer installed operating parameter facilitates an expedited initialization of the device.

9. The method of claim 1, wherein the system operation comprises at least one of a cryptographic operation, an error correction code generation, a data rebuild, or a security operation.

10. The method of claim 1, wherein the upstream component is a server and the device is a data storage device.

11. The method of claim 1, wherein the system operation comprises a task offloaded by the host for execution by the device responsive to the identification of the manufacturing origin of the device.

12. The method of claim 1, wherein the system operation is identified by for diversion to the device in a distribution strategy generated by the distribution module prior to identifying the manufacturing origin of the device.

13. The method of claim 12, wherein the distribution strategy sets an operational trigger for execution of the system operation, the operational trigger detected by the distribution module.

14. The method of claim 12, wherein the distribution strategy prescribes a burst mode that delays execution of the system operation and dedicates hardware of the device to satisfaction of host-generated data access requests.

15. An apparatus comprising a distribution module configured to be operably coupled between an upstream device and a downstream device in a computer network, the distribution module comprising a controller circuit configured to determine a manufacturing origin of the downstream device, and to assign a system operation from the upstream device for execution by the downstream device using a unique capability of the downstream device resulting from the determined manufacturing origin, the controller circuit determining the manufacturing origin of the downstream device by passively measuring a time-based metric required to complete a plurality of data access requests to transfer data between the upstream device and a memory of the downstream device and correlating the time-based metric to predetermined, unique device behavior associated with a known manufacturer of the device independently of a separate manufacturing origin identifier data value that identifies the known manufacturer.

16. The apparatus of claim 15, wherein the controller circuit subsequently confirms the previously determined manufacturing origin of the downstream device by reading the separate manufacturing origin identifier data value from the device.

17. The apparatus of claim 16, wherein the time-based performance characteristic is at least a selected one of a latency, a transfer rate, an overall time to completion, a maximum speed, an input/output per second data transfer rate, or an average completion time of the device during processing of the plurality of data access requests.

18. The apparatus of claim 15, wherein the controller circuit subsequently confirms the manufacturing origin of the downstream device by actively communicating a test pattern to the downstream device to identify an operational configuration of the downstream device.

19. The apparatus of claim 15, wherein the execution of the system operation by the downstream device is carried out without executing a security protocol to establish a trust boundary that includes the upstream device and the downstream device.

20. The apparatus of claim 15, wherein the downstream device is a data storage device, and the system operation comprises at least one of a cryptographic operation, an error correction code generation, a data rebuild, or a security operation.

* * * * *